(12) United States Patent
Jho et al.

(10) Patent No.: US 8,812,867 B2
(45) Date of Patent: Aug. 19, 2014

(54) METHOD FOR PERFORMING SEARCHABLE SYMMETRIC ENCRYPTION

(75) Inventors: Nam-Su Jho, Seoul (KR); Do-Won Hong, Daejeon (KR); Hyun-Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 852 days.

(21) Appl. No.: 12/962,047

(22) Filed: Dec. 7, 2010

(65) Prior Publication Data

US 2011/0145594 A1 Jun. 16, 2011

(30) Foreign Application Priority Data

Dec. 16, 2009 (KR) .................. 10-2009-0125540

(51) Int. Cl.
*G06F 21/00* (2013.01)

(52) U.S. Cl.
USPC ............................................ 713/189; 380/44

(58) Field of Classification Search
CPC .......... G06F 17/30666; G06F 21/6227; G06F 17/30312; G06F 2211/007; H04L 9/3236; H04L 9/008; H04L 2209/60
See application file for complete search history.

(56) References Cited

U.S. PATENT DOCUMENTS

| 2005/0147246 | A1 | 7/2005 | Agrawal et al. |
| 2009/0113213 | A1 | 4/2009 | Park et al. |
| 2010/0114964 | A1* | 5/2010 | Kerschbaum et al. ........ 707/783 |
| 2010/0146299 | A1* | 6/2010 | Swaminathan et al. ...... 713/189 |
| 2010/0153403 | A1 | 6/2010 | Chang et al. |

FOREIGN PATENT DOCUMENTS

| KR | 1020080035295 | 4/2008 |
| KR | 10-2009-0041545 | 4/2009 |
| KR | 10-2009-0056078 | 6/2009 |
| KR | 10-2010-0068042 | 6/2010 |

OTHER PUBLICATIONS

Park, Hyun-A et al., "Secure Index Searching Schemes for Groups," Journal of Institute of Information Security and Cryptology, pp. 87-97 (2005).
Boneh, Dan et al., "Conjunctive, Subset, and Range Queries on Encrypted Data," Theory of Cryptography, Lecture Notes in Computer Science, vol. 4392:535-554 (2007).
Curtmola, Reza et al., "Searchable Symmetric Encryption: Improved Definitions and Efficient Constructions," Proceedings of the 13th ACM Conference on Computer and Communications Security (2006).

* cited by examiner

*Primary Examiner* — Michael S McNally
*Assistant Examiner* — Carlton Johnson
(74) *Attorney, Agent, or Firm* — Nelson Mullins Riley & Scarborough LLP; Anthony A. Laurentano; Lewis Lee

(57) ABSTRACT

Disclosed is a method for searchable symmetric encryption. The method for performing searchable encryption and searching for encrypted data includes: setting all necessary variables and preparing a secret key necessary for encryption; encrypting a data using the secret key and a given data and generating an index to be used for later search, to store the encrypted data and the index; generating a trapdoor to be used to search the encrypted data by using the secret key and a keyword to be used for the searching; and searching a desired data using the generated trapdoor and the stored index.

7 Claims, 3 Drawing Sheets

METHOD FOR PERFORMING SEARCHABLE SYMMETRIC ENCRYPTION

CROSS REFERENCE TO RELATED APPLICATIONS

This application claims priority to Korean Patent Application No. 10-2009-0125540 and filed on Dec. 16, 2009, the entire contents of which are herein incorporated by reference.

BACKGROUND OF THE INVENTION

1. Field of the Invention

The present invention relates to a method for searchable symmetric encryption, and more particularly, to a method for searchable symmetric encryption capable of providing efficient range search by using a linked graph.

2. Description of the Related Art

A modern society is changed into a society that digitalizes and stores all information and shares and uses the stored information through a network. Further, due to the increase in the amount of processed data and demands for various services, various specialized external storage space are being extensively utilized.

Moreover, security of information stored in the external storage space has become an issue. Security in the external storage space is different from when individuals managed information by oneself using an independent storage space. The reason for this is that an information owner is fundamentally different from one that manages the external storage space. An access control technique or a key management technique which is principally used to protect the information in a database is effective in preventing an external intruder, but the techniques cannot fundamentally prevent a manager of the external storage space from reading data stored in the corresponding storage means.

As a result, data encryption may be used as a method for safely storing the information. That is, information to be stored in the external storage space is encrypted by using an encryption system proven to be secure. The encryption system having the proved safety ensures that an attacker who does not own a decryption key cannot acquire stored information from ciphertext. Therefore, even though the external intruder or the manager of the storing space access the stored ciphertext, they do not actually obtain any significant information. Meanwhile, encryption of information is a method for perfectly securing confidentially stored information, but the information encryption also disables many additional functions provided from the general database. That is, as the amount of stored information increase, various database functions are required to efficiently utilize and manage the stored information. Therefore, a method for simply encrypting and storing the information is not applicable.

A searchable encryption protocol is contrived to search for data including a predetermined keyword while ensuring the confidentiality of the encrypted information like the general encryption system. Since most of the various functions provided from the database are based on keyword search, the searchable encryption system is considered as one of the solutions to the above-mentioned problems.

In the searchable encryption system, it is assumed that each document consists of several keywords, and the query is determined by keywords that the user wants to search. Because ciphertext in encryption systems reveals no information about an encrypted data, searchable encryption provides a clue for searching, which is called an 'index'. An index contains information about the relations between keywords and encrypted data. However, an index is also locked in order to keep it secret, and can only be opened by those possessing a special key, called a 'trapdoor'. Since a search is executed by the database server, to conduct one, the user has to generate and hand over a trapdoor to the server.

Usually, searchable encryption consists of four algorithms: key generation, build index, trapdoor generation, and search. In the key generation step, the user chooses an encryption system and prepares other parameters including encryption and decryption keys. A set of data and system parameters are given to the build index algorithm as an input. The build index algorithm outputs encrypted data and indexes. Outputs of the build index algorithm are sent to the server and stored. If the user wants to search for data, then the user runs the trapdoor generation algorithm. The keywords that the user wants to use in the search and the user's secret key are input into the trapdoor generation algorithm. After the trapdoor is given to the server, the server runs the search algorithm. The trapdoor and indexes are input for the search, and the result of the search algorithm is a set of documents corresponding to the queried keyword. Finally, the result of the search is given to the user.

Basic searchable encryption provides a search algorithm that finds documents corresponding to just one specific keyword. However, this search algorithm is very limited and cannot satisfy various demands that naturally arise. Therefore, designing a searchable encryption with useful additional functions is an important goal in searchable encryption. Frequently mentioned additional functions are conjunctive keyword search, range search, ordering, size comparison, and arbitrary search etc. The present patent concentrates on the range search.

Formally, a range search is a search of documents of which corresponding keywords are included within a set of successive keywords, an interval, rather than as a single keyword. To achieve a range search regarding an interval [a, b] using ordinal searchable encryption, the user has to do simple keyword searches $b-a+1$ times repeatedly. This is a very inefficient and insecure method. Because the server, which actually runs the search algorithm, trivially obtains information regarding the size of the range and can also divide the result into $b-a+1$ subsets, each subset actually corresponds to a single keyword.

The research results for the range search are very infrequent until now. U.S.A. patent laid open publication No. 2005-014724 (System and Method for Fast Querying of Encrypted Databases) discloses a searchable encryption system supporting the range search for the encrypted data. This method uses a scheme that divides data into segments having any size and encrypts them into a segment unit (data included in the same segment is encrypted by the same encryption key). The method further requires a post-processing process to remove a false hit included in the searching result and has lower safety than the encryption method.

"'Conjunctive, Subset and Range Queries on Encrypted Data,' TCC 2007, LNCS 4392, pp 535-554, 2007" by Boneh, et al., discloses a safety model for a coupling keyword search, a subset search, and a range search and a searchable encryption system supporting various types of searches having safety verified by the model. The method provides verifiable safety by a public key based design but requires a lot of time to perform bilinear and public key operation.

"'Searchable Symmetric Encryption Improved Definitions and Efficient Constructions,' Proc of the ACMCCS, Proc. of the 13th ACMCCS 2006, pp. 79-88, 2006" by Curtmola et al., discloses a searchable encryption system based on a linked chain. The method is very efficient in terms of a searching speed but does not disclose a further function of a range search, and the like.

SUMMARY OF THE INVENTION

The present invention proposes to solve the above problems. It is an object of the present invention to provide a method for searchable symmetric encryption providing an efficient range search by a linked graph by using only a simple one-way function such as a hash function.

A searchable encryption is a cryptographical protocol enabling a keyword search for encrypted data and encrypts and stores data, thereby making it possible to easily search for desired data while maintaining security of data.

The searchable encryption technology may be divided into a searchable symmetric encryption system and a searchable public key encryption system according the characteristics of the encryption system.

A method for searchable symmetric encryption is designed based on symmetric encryption and is more efficient than the public key method for encryption and search, such that it is suitable for a large-capacity database. However, since the method for searchable symmetric encryption uses the symmetric key scheme, it is disadvantageous in that only the owner (user) of the secret key can perform the encryption and search and it has a limitation in providing various additional functions. Research and development for the method for searchable symmetric encryption providing various additional functions provided in the method for the current searchable public key encryption has actively progressed. The present patent provides the method for searchable symmetric encryption providing a range search function.

The method for searchable symmetric encryption is configured to include four steps, which are a key generation step, a build index step, a trapdoor generating step, and a search step.

The key generation step is a step that a user sets all variables necessary for a system and prepares a secret key necessary for encryption by a user.

The build index step is a step that the user encrypts a data using the secret key and generates an index to be used for later search. In this case, the generated ciphertext and index are stored in the external server (database).

The trapdoor generating step is a step that the user generates a trapdoor to be used for search of data by using the secret key of the user and the keyword to be used for the searching. The trapdoor may be designed not to obtain information on the keyword to be used for the searching by the server. The searching step is a step that the server searches for a data desired by a user by using the given trapdoor and the stored index.

At the searching step, the server is designed to know whether the stored data are the data desired by user and not to know any information on a keyword searched by the user or contents of the stored data.

The unit of information performing the index generation and search is referred to as a keyword and the range search means simultaneously searching for data conforming to all the keywords included in the given range (or interval) through a one-time query. The simplest method for the user to perform the range search is a method of performing a search several times by using each keyword included in the range but this is inefficient. Further, since the server knows the result and additional information of each keyword, there is a problem in regards to a safety aspect. In order to solve the problem, the proposed method is a range search.

The present invention extends the linked list proposed by Curtmola, et al., in 2006, to the linked graph of the searchable symmetric encryption system that can search the range using this.

According to the present invention, it can remarkably reduce the calculation necessary for the encryption and the generation and search of the trapdoor since it uses only a simple calculation of the one-way function such as a hash function, etc., without using a complex public key calculation generally used in the existing range searching method. Further, the existing methods perform the search for all the indexes, while the present invention searches for only the indexes of data included in the range to be searched by using the linked graph structure. As a result, the present invention may be referred to the searchable encryption method more suitable for a large-capacity database.

In other words, the present invention provides the range search function to efficiently improve the search time and the calculation.

Further, the present invention provides the searchable encryption system suitable for the large-capacity database.

In addition, the safety of the method according to the present invention is cryptographically verified.

DETAILED DESCRIPTION OF THE PREFERRED EMBODIMENTS

The present invention will be described below with reference to the accompanying drawings. Herein, the detailed description of a related known function or configuration that may make the purpose of the present invention unnecessarily ambiguous in describing the present invention will be omitted Exemplary embodiments of the present invention are provided so that those skilled in the art may more completely understand the present invention. Accordingly, the shape, the size, etc., of elements in the figures may be exaggerated for explicit comprehension.

Hereinafter, a method for searchable symmetric encryption according to the present invention will be described in detail.

Figure 1:
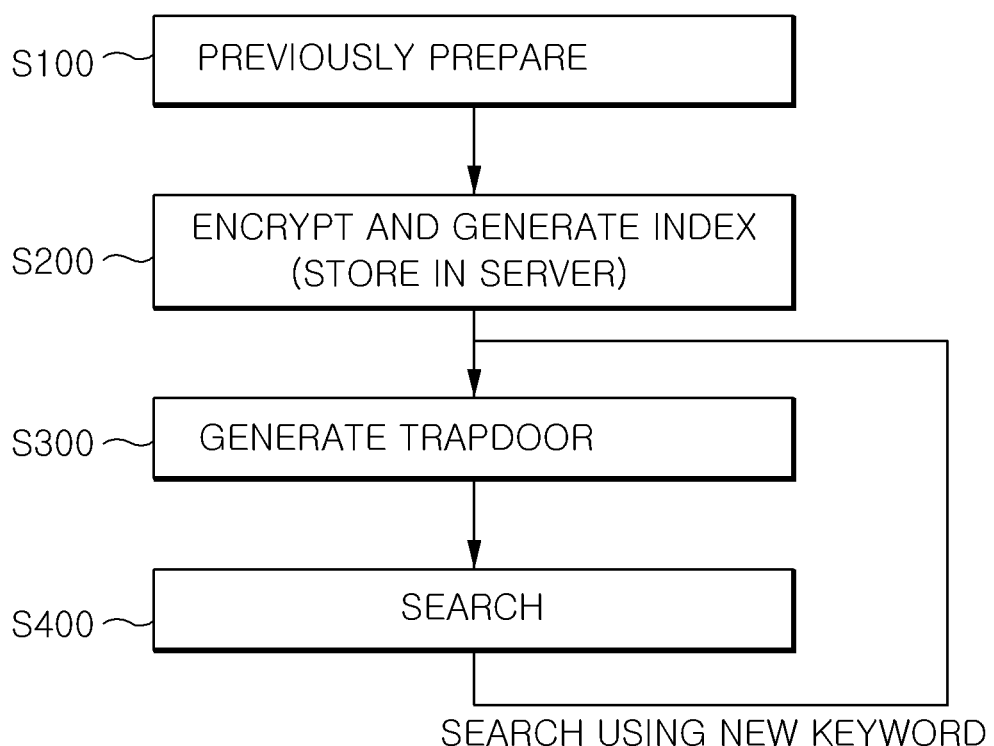
FIG. 1 is a flow chart of a method for searchable symmetric encryption according to the present invention.

The basic architecture of the method for searchable symmetric encryption according to the present invention is shown in FIG. 1. The basic architecture is configured to include generating and previously preparing a secret key of a user (S100), encrypting data and generating indexes and storing them in a database by a user (S200), generating a trapdoor by a user by using a given keyword (S300), and searching by a server (computing device) (S400).

In the present invention, the number of data to be stored is denoted as N and keywords included in each data is represented as an integer value (all keywords may be considered as a bit string having a predetermined length) from 1 to R. For convenience, assume that $R=2^r$ is satisfied due to an existence of any integer r. Further, assume that each data has an integer from 1 to N as an identifier of data.

The key generation step of the user (100) determines a secret key k and a one-way function f: $r\times\{0,1\}^r \to \{0,1\}^s$, h: $r\times\{0,1\}^r \to \{0,1\}^w$ to be used in encrypting the symmetric encryption system E (use the secret key having a w bit length)

and data, where s=log(r×(N+R)). The secret key k and the one-way function f, h are secret information known to only the user.

The index (A) generated in the build index step (200) is an array formed of r×(N+R) elements and has a form of A[i]= ($ID_i$, ($LD_i$, $LK_i$), ($RD_i$, $RK_i$)). $ID_i$ represents an identifier of the data stored in the element and ($LD_i$, $LK_i$) and ($RD_i$, $RK_i$) are two linkages indicating next elements. A method configuring the index (A) is as follows. For convenience, S is a set of all the data, $S_i$ is a set of data including keywords i (i∈{1, 2, ..., R}).

1. The user configures an array A and initializes all the values of each element to 'EMPTY' or 0.

2. The user generates an array B including elements with the same number to A. The array B is a temporary array in which each element has a size of w bits and is initialized as 'EMPTY.'

3. Separating interval

Set the initial interval $R_{0,0}$=[1, R]

For t∈{1, 2, ..., r}, the following work is performed from t=1 to t=r. However, d=0, ..., $2^t-1$.

i) For an interval $R_{t-1,d}$=[a, b], compute $$E_{t-1,d} = \left\lfloor \frac{a+b}{2} \right\rfloor.$$

ii) Separate $R_{t-1,d}$ into two sub-intervals, $R_{t,2d}$=[a, $E_{t-1,d}$] and $R_{t,2d+1}$=[$E_{t-1,d}$+1, b].

Figure 2:
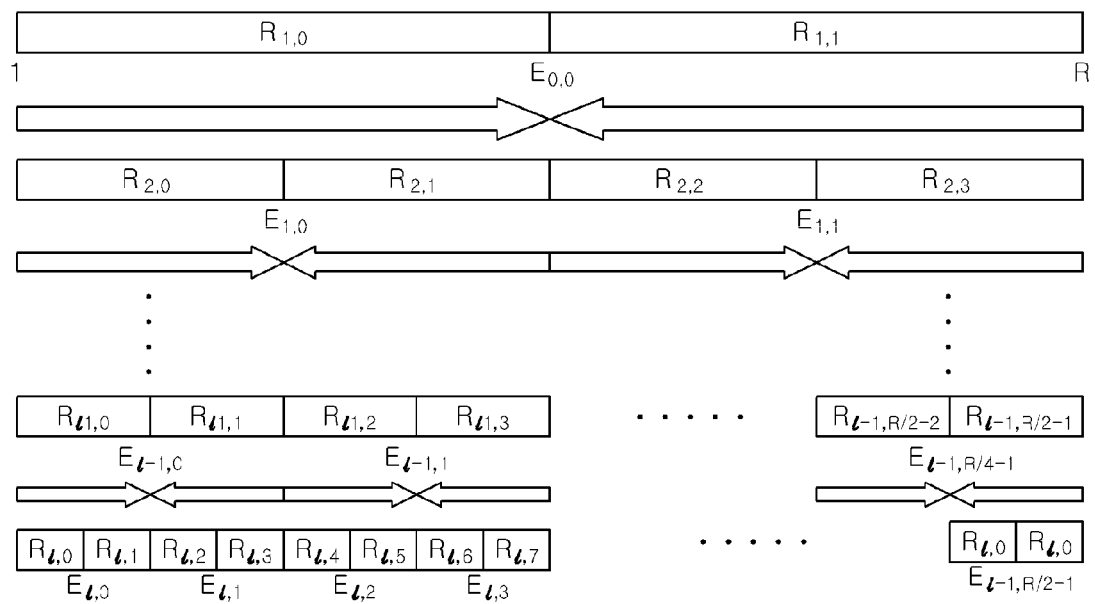
FIG. 2 is a diagram showing definition of an interval tree used in the present invention.

FIG. 2 is a diagram showing definition of an interval tree used in the present invention. Referring to FIG. 2, $R_{t-i,d}$ is divided into two sub-intervals from t=1 to t=r.

4. Indication of a starting point: for each t, i (1≤t≤r, 1≤i≤R), f(t, i) is calculated and A[f(t, i)] is searched. A[f(t, i)] is reserved as a starting point for a t-th layer of a keyword i. In other words, a value of $ID_{f(t,i)}$ is changed from 'EMPTY' to 'NONE' and h(t, i) is stored in B[f(t, i)].

5. For each t, i (1≤t≤r, 1≤i≤R), $S_{t,i}$=$S_i$ is defined and the following process is performed.

A data D is optionally selected in $S_{t,i}$ and is stored in $ID_{f(t,i)}$ and data D is deleted from the $S_{t,i}$. If $S_{t,i}$ is an empty set, all the following processes are omitted and progresses to the next t and i.

The following is repeated until $S_{t,i}$ is an empty set.

i) Select a data D in $S_{t,i}$ randomly, and D is deleted in S.

ii) 'EMPTY' element A[j] is randomly selected among elements of the array A and random w bit key $k_j$ is generated.

iii) The identifier of D is stored in $ID_j$ and $k_j$ is stored in B[j].

iv) In a linked tree starting from A[f(t, i)], one 'EMPTY' link is searched and the value of the link is changed to (j, $k_j$).

For convenience, the linked tree generated by the above method will be denoted as $G_{t,i}$ for each t, i.

Figure 3:
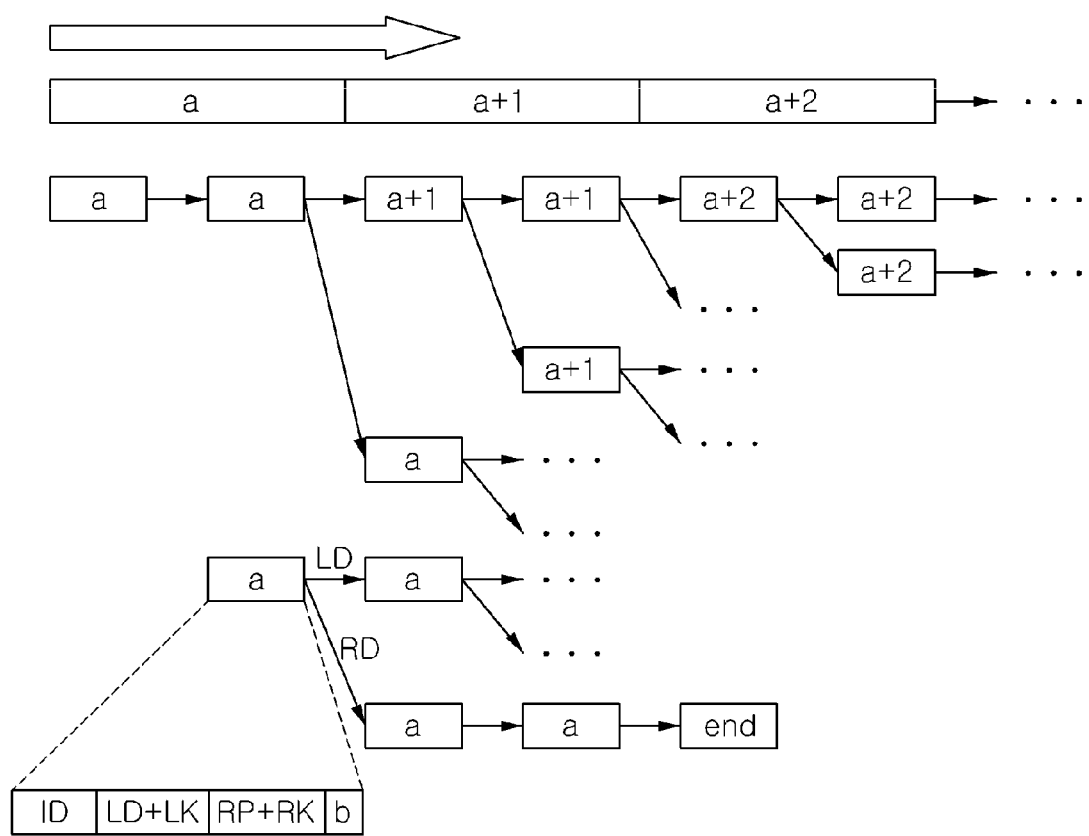
FIG. 3 is architecture of a linked tree used in the present invention.

FIG. 3 is architecture of a linked tree used in the present invention. Referring to FIG. 3, the linked tree generated by the above method is presented as an example.

6. Connection of an external link: the user performs the following process on all $R_{t,d}$=[a,b](1≤t≤r, 0≤d≤$2^r-1$).

When d is even number, $G_{t,a}$, $G_{t,a+1}$, ..., $G_{t,b}$ is concatenated in an ascending order using $G_{t,a}$ as a starting point. In other words, (f(t,i+1), h(t,i+1)) is stored at one of the 'EMPTY' links of G.

When d is an odd number, $G_{t,b}$, $G_{t,b-1}$, ..., $G_{t,a}$ are concatenated in a descending order by using $G_o$ as a starting point. In other words, (f(t,i−1), h(t,i−1)) is stored at one of the 'EMPTY' links of $G_{t,i}$.

7. An empty element among the elements of the array A and B is filled with randomly generated value. Finally, each element A[j] is encrypted by using B[j] as a secret key. In other words, $E_{B[j]}$(A[j]) is computed. A[j] is replaced with $E_{B[j]}$(A[j]).

8. Array B is deleted.

Each data $D_i$ is encrypted using the user's secret key k separately from the index and the index and the ciphertext is transmitted to the server to be stored.

At the trapdoor generating step 300, the user generates the trapdoor for any search range [a, b].

1. the user first searches t∈{1, 2, ..., r} suitable for [a, b] as follows.

it is initialized to t=1, $R_0$=[1,R]=[$a_0$, $b_0$].

$$E_t = \left\lfloor \frac{a_{t-1} + b_{t-1}}{2} \right\rfloor$$

is calculated and if $E_t$ E[a, b], t value is stored and ends.

If $E_t$<a, then $a_t$=$E_t$, $b_t$=$b_{t-1}$ are set. Otherwise (i.e. $E_t$>a), $a_t$=$a_{t-1}$, $b_t$=$E_{t-1}$ are set. After being changed into t=t+1, it is returned to the above step.

2. The user calculates the trapdoor with t obtained at step 1.

Trapdoor=((f(t,a),h(t,a)),(f(t,b),h(t,b)))

3. The above obtained t has the following characteristics.

When [a, b] is divided by two sub-intervals [a, $E_t$],[$E_t$+1,b], each sub-interval is included in the two consecutive intervals such as [a,$E_t$]⊆$R_{t,d}$, [$E_t$+1,b]⊆$R_{t,d+1}$. ($R_{t,d}$, $R_{t,d+1}$ are intervals defined at the build index step) In addition, $R_{t,d}$ is defined as the linked chain in a right direction and $R_{t,d+1}$ is defined as the linked chain in a left direction, which each has $E_t$ and $E_t$+1 as an end point.

Therefore, when searching for the value of the two linked chains starting from a and b ending at $E_t$ and $E_t$+1, all data included in [a, b] can be searched.

At the searching step (400), assume that the server receives the trapdoor ((f(t,a),h(t,a)), (f(t,b),h(t,b))) from the user.

The server first searches A[f(t,a)] at the array A and decrypts A[f(t,a)] by using h(t,a) as a decryption key.

Assuming that the decrypted element is A[v]=($ID_v$, ($LD_v$, $LK_v$), ($RD_v$, $RK_v$), $b_v$), $ID_v$ is included in the search results and the search is performed for each link.

In other words, A[$LD_v$] is decrypted with $LK_v$ and the stored identifier is included in the result list. This process is continued until all the links starting from A[v] has 'EMPTY' value. Similarly, the search for the linked chain starting from A[f(t,b)] is performed. Finally, the indexes of all the searched data are transmitted to the user.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the exemplary embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A method for performing searchable encryption and searching for encrypted data, comprising:
    setting all necessary variables and preparing a secret key necessary for encryption;
    encrypting a data using the secret key and a given data and generating an index to be used for later search, to store the encrypted data and the index;
    generating a trapdoor to be used in searching for the encrypted data by using the secret key and a keyword for the searching; and
    searching for a desired data using the generated trapdoor and the stored index,
    wherein, when encrypting the data and generating the index, the generated index (A) is an array formed of r×(N+R) elements, where N is the number of data to be encrypted, R is a maximum integer value defining a keyword included in each data, and r is an integer satisfying R=$2^r$ and has a form of A[i]=(ID$_i$, (LD$_i$, LK$_i$), (RD$_i$, RK$_i$)), where ID$_i$ is an identifier stored in the element and (LD$_i$, LK$_i$) and (RD$_i$, RK$_i$) are two links indicating next elements,
    wherein generating the index (A) comprises:
    generating an array B having the same number of elements as an array A configured by the user;
    initializing all the values of each element for the arrays A and B, setting the initial interval R$_{0,0}$=[1, R]; and
    for t∈{1, 2, . . . , r}, computing $$E_{t-1,d} = \left\lfloor \frac{a+b}{2} \right\rfloor$$

and separating R$_{t-1,d}$ into two sub intervals R$_{t,2d}$=[a, E$_{t-1,d}$] and R$_{t,2d+1}$=[E$_{t-1,d}$+1, b] for R$_{t-1,d}$=[a,b] from t=1 to t=r (where d=0, . . . , $2^t$−1).

2. The method for performing searchable encryption and searching for encrypted data according to claim 1, wherein the encrypting the data and the generating the index comprising storing the encrypted data and the generated index in a database, and
    the generating the trapdoor is designed that a computing device does not obtain information on the keyword for the searching from the generated trapdoor.

3. The method for performing searchable encryption and searching for encrypted data according to claim 1, wherein the searching is designed that a computing device knows whether the stored and encrypted data are a data desired by a user and does not know any information on a keyword searched by the user or contents of the stored and encrypted data.

4. The method for performing searchable encryption and searching for encrypted data according to claim 1, wherein each element of the array B has a size of λ bit and is a temporary array for storing an encryption key.

5. The method for performing searchable encryption and searching for encrypted data according to claim 1, wherein the generating the index (A) further comprising:
    calculating f(t, i) for each t, i (1≤t≤r, 1≤i≤R) and searching for A[f(t, i)]; and
    reserving the A[f(t, i)] as a starting point for t-th layer of a keyword i.

6. The method for performing searchable encryption and searching for encrypted data according to claim 5, wherein the generating the index (A) further comprising:
    defining as S$_{t,i}$=S$_i$ for t, i (1≤t≤r, 1≤i≤R); and
    optionally selecting a data D in S$_{t,i}$ and storing the data D in ID$_{f(t,i)}$ and deleting the data D from the S$_{t,i}$.

7. The method for performing searchable encryption and searching for encrypted data according to claim 6, wherein the generating the index (A) further comprising: when the S$_{t,i}$ is not an empty set,
    randomly selecting a data D in the S$_{t,i}$ and deleting the data D from the S$_{t,i}$;
    randomly selecting an initialized element A[j] among elements of the array A;
    generating random w bit key k$_j$;
    storing an identifier of the data D in ID$_j$ and storing k$_j$ in B[j]; and
    searching for one initialized link in a linked tree starting from the A[f(t, i)] and changing the value of the link to (j, k$_j$).

* * * * *